US010982667B2

United States Patent
Charles

(10) Patent No.: US 10,982,667 B2
(45) Date of Patent: Apr. 20, 2021

(54) BRUSHLESS SLOTLESS DC MOTORS FOR FLUIDIC PUMP CONTROL

(71) Applicant: Alcon Inc., Fribourg (CH)

(72) Inventor: Steven T. Charles, Memphis, TN (US)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 16/581,818

(22) Filed: Sep. 25, 2019

(65) Prior Publication Data
US 2020/0102949 A1   Apr. 2, 2020

Related U.S. Application Data

(60) Provisional application No. 62/739,549, filed on Oct. 1, 2018.

(51) Int. Cl.
*F02M 37/08* (2006.01)
*F04B 49/06* (2006.01)
*F04B 43/12* (2006.01)
*H02P 5/46* (2006.01)

(52) U.S. Cl.
CPC .............. *F04B 49/06* (2013.01); *F04B 43/12* (2013.01); *H02P 5/46* (2013.01); *H02P 2209/11* (2013.01)

(58) Field of Classification Search
CPC ....... H02P 5/46; H02P 2209/11; F02M 37/08; F04B 49/06; F04B 43/12
See application file for complete search history.

(56) References Cited

U.S. PATENT DOCUMENTS

| 9,482,216 | B2 | 11/2016 | Sorensen | |
|---|---|---|---|---|
| 2001/0051098 | A1* | 12/2001 | Kenney | F02M 37/08 417/410.1 |
| 2011/0162753 | A1* | 7/2011 | Bolt | B67D 7/54 141/1 |
| 2017/0215990 | A1* | 8/2017 | Nakamura | A61C 1/088 |

\* cited by examiner

*Primary Examiner* — Cortez M Cook

(57) ABSTRACT

In certain embodiments, a fluidic pump system includes a brushless slotless direct current (BSDC) motor mechanically coupled to a fluidic pump, and a motor controller communicably coupled to the BSDC motor. The BSDC motor is configured to drive the fluidic pump, and the motor controller is configured to generate command signals to drive the BSDC motor. The fluidic pump system further includes commutation circuitry coupled to the BSDC motor that is configured to provide digital sine-wave commutation of the BSDC motor and to provide an indication of movement of the BSDC motor to the motor controller.

15 Claims, 2 Drawing Sheets

BRUSHLESS SLOTLESS DC MOTORS FOR FLUIDIC PUMP CONTROL

FIELD

The present disclosure relates to fluidic pump systems, and more particularly to control of fluidic pumps (e.g., peristaltic pumps or rotary proportional valves) using brushless slotless direct current (BSDC) motors.

BACKGROUND

Fluidic pumps, such as peristaltic pumps, may be used in many different applications including delivery of fluid during surgical applications (e.g., ophthalmic surgical applications). Peristaltic pumps may operate by compressing a length of tubing to move a fluid in the tubing or squeeze a molded flow channel between an elastomeric sheet and a rigid substrate to move a fluid between the elastomeric sheet and the rigid substrate. Rotating roller heads applied against the tubing or elastomeric sheet may be used for compressing the tubing or elastomeric sheet. Fluidic pumps, such as peristaltic pumps, may typically be controlled using stepper motors.

SUMMARY

In certain embodiments, a fluidic pump system may include a fluidic pump, a brushless slotless direct current (BSDC) motor mechanically coupled to the fluidic pump, and a motor controller communicably coupled to the BSDC motor. The BSDC motor may be configured to drive the fluidic pump, and the motor controller may be configured to generate command signals to drive the BSDC motor. The fluidic pump system may further include commutation circuitry coupled to the BSDC motor that is configured to provide digital sine-wave commutation of the BSDC motor and to provide an indication of movement of the BSDC motor to the motor controller.

In certain embodiments, an ophthalmic surgical system may include a console configured to couple to a surgical handpiece. The console may include a fluidic pump system comprising a brushless slotless direct current (BSDC) motor mechanically coupled to a fluidic pump, and circuitry coupled to the fluidic pump system, the circuitry configured to control operation of the BSDC motor using digital sine-wave commutation. The fluidic pump system may be configured to be in fluidic communication with a surgical handpiece when the surgical handpiece is coupled to the console A BSDC motor could alternatively be mechanically coupled to a pump located within a surgical handpiece.

In certain embodiments, a method of operating a fluidic pump includes generating, by a motor controller, one or more command signals and providing command signals generated by a motor controller to a three-phase amplifier. The method also includes generating, by the three-phase amplifier, a three-phase signal based on the command signal and providing the three-phase signal, typically sine waves, to a brushless slotless direct current (BSDC) motor to drive a fluidic pump based on the three-phase signal. The method further includes providing, by a sine-cosine encoder with an analog-to-digital converter (ADC) mechanically coupled to the BSDC motor, digital sine-wave commutation of the BSDC motor.

In one or more embodiments, a three-phase amplifier may be communicably coupled to a motor controller and to the BSDC motor. The three-phase amplifier may be configured to receive the command signals generated by the motor controller and provide a three-phase signal to the BSDC motor based on the signals generated by the motor controller. The three-phase amplifier may be a pulse width modulation (PWM) three-phase amplifier or a linear three-phase amplifier. In one or more embodiments, circuitry for commutating the BSDC motor may include a sine-cosine encoder and an analog-to-digital converter (ADC) electronically coupled to the sine-cosine encoder. The circuitry may include an absolute encoder and/or incremental encoder functionality. In one or more embodiments, torque sensing circuitry may be included. The torque sensing circuitry may be configured to detect a torque output by the BSDC motor and to provide an indication of the detected torque output to the motor controller. In one or more embodiments, the fluidic pump may include a peristaltic pump or a rotary proportional valve (to control flow by varying fluidic resistance; infusion from a constant pressure source could be throttled by a rotary proportional valve, aspiration could be throttled by a constant vacuum source coupled a fluid reservoir).

Certain embodiments may provide one or more technical advantages, in some instances. For example, traditional stepper motors used for fluidic pumps are position controlled, not force/torque-controlled devices, while brushless DC (BLDC) motors and brushless slotless DC (BSDC) motors are torque-controlled devices that can be controlled in position mode using sine-cosine encoders and position control feedback loops. BSDC motors may also have better thermal efficiency than BLDC motors, and decreased eddy current and hysteresis losses. BSDC motors also produce no vibration, while stepper motors produce significant vibration (which may be transferred to surgical devices or the fluid being pumped).

In addition, BSDC motors and their drive electronics may produce much less EMF and RFI than stepper motors or brushed DC motors. BSDC motors can also be used as zero velocity torque device ideal for pressure/vacuum control in conjunction with non-invasive pressure sensors and feedback control loops; infusion and aspiration are pressure/vacuum are force/torque, not position, variables. BSDC motors mean time between failures (MTBF) may only be driven by bearing failure, typically approximately 10,000 hours with ABEC 5 bearings, whereas brushed DC motors MTBF are typically driven by brush life which is proportional to current and torque (brushed DC motors typical MTBF is approximately 1000 hours).

Moreover, BSDC motors have less than 1% torque ripple, whereas stepper motors by design have magnetic "detents" and BLDC motors have ~40% torque ripple. Because torque ripple produces fluidic pressure fluctuations that must be filtered out of noninvasive pressure sensor (NIPS) signals, the lower torque ripple of BSDC motors may be preferable. Further, minimally compliant, high durometer tubing that may be used for phacoemulsification or vitreoretinal fluidics will not dampen the pressure fluctuations produced by torque ripple or magnetic detents from stepper motors, making BSDC motors preferable for ophthalmic surgical systems.

These and other advantages will be apparent to those skilled in the art in view of the present drawings and specification.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

Figure 1:
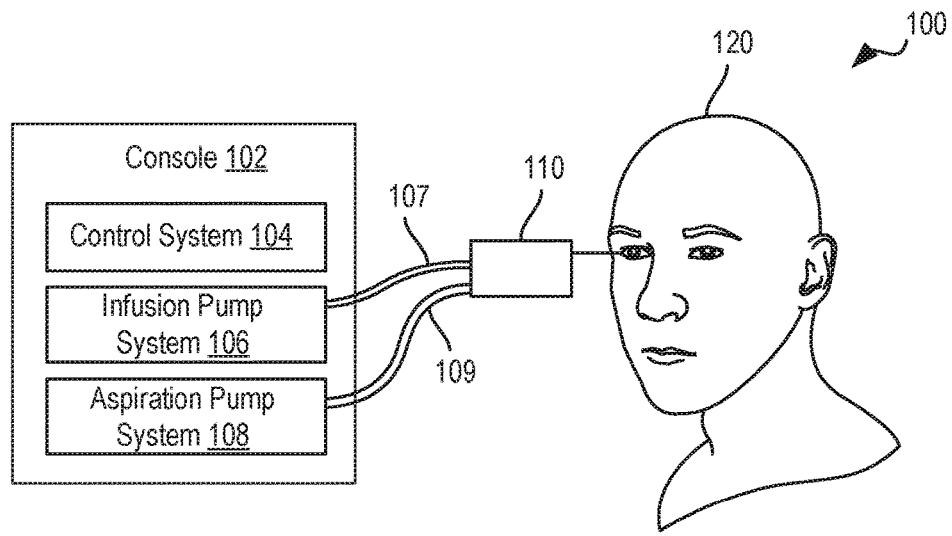
FIG. 1 is a diagram of an example ophthalmic surgical system.

One skilled in the art will understand that the drawings, described below, are for illustration purposes only, and are not intended to limit the scope of applicant's disclosure.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Alterations and further modifications to the described systems, devices, and methods, and any further application of the principles of the present disclosure are contemplated as would normally occur to one skilled in the art to which the disclosure relates. In particular, it is contemplated that the systems, devices, and/or methods described with respect to one embodiment may be combined with the features, components, and/or steps described with respect to other embodiments of the present disclosure. For the sake of brevity, however, the numerous iterations of these combinations will not be described separately. For simplicity, in some instances the same reference numbers are used throughout the drawings to refer to the same or like parts.

FIG. 1 is a diagram of an example ophthalmic surgical system 100. The example ophthalmic surgical system 100 may be utilized in performing ophthalmic surgical procedures, such as phacoemulsification, vitreo-retinal procedures, or both, on the patient 120. In particular, the ophthalmic surgical system 100 shown may be implemented for use in a conventional phacoemulsification procedure. However, it will be understood that the ophthalmic surgical system 100 may be configured in another manner for certain procedures. For example, ophthalmic surgical system 100 may be configured to have separate fluid connections to the eye of the patient 120, which may be useful in bimanual phacoemulsification or vitreo-retinal procedures.

The ophthalmic surgical system 100 includes a console 102 coupled to a surgical handpiece 110. The surgical handpiece 110 may be used by a surgeon or other professional to perform certain aspects of an ophthalmic procedure on the patient 120. The ophthalmic surgical system 100 may include additional, fewer, or different components than those illustrated in FIG. 1. Further, the components of the ophthalmic surgical system 100 may be arranged in another manner than that shown in FIG. 1.

The console 102 includes a control system 104, an infusion pump system 106, and an aspiration pump system 108. The control system 104 includes circuitry to control one or more components of the console 102 or to perform other functions or operations as described herein. In some cases, the control system 104 may include a processor, memory, software, and firmware that are configured to perform such functions and operations. In some cases, the control system 104 may also include hardware logic circuitry (e.g., field programmable gate arrays (FPGAs), application-specific integrated circuits (ASICs), digital signal processors (DSPs), or system-on-chips (SOCs)) for performing one or more functions as described herein. As an example, the control system 104 may include one or more of the control components of the fluidic pump system 200 of FIG. 2, such as the motor controller 202. However, in some cases, the motor controller 202 may be implemented within the infusion pump system 106, the aspiration pump system 108, or both (e.g., a motor controller in each pump system 106, 108).

The infusion pump system 106 and aspiration pump system 108 each include at least one fluidic pump for pumping fluid into and out of the surgical handpiece 110, respectively. For instance, in the example shown, the infusion pump system 106 is configured to pump fluid into the surgical handpiece 110 (and, potentially, then into the eye of the patient 120) through tube 107, and the aspiration pump system 108 is configured to pump fluid out of the surgical handpiece 110. The infusion pump system 106, the aspiration pump system 108, or both, may include a peristaltic pump for pumping the fluid. For instance, a peristaltic pump may be used for infusion or aspiration pumping of fluids. Typically, the fluidic pumps within these systems are driven by stepper motors (e.g., microsteppers). However, stepper motors may not be optimal. For instance, stepper motors may not be designed for zero-velocity torque control operation, and may exhibit resonance, overshoot, or ringing. In addition, stepper motors are position-controlled, not force/torque-controlled, which may not be optimal for driving fluidic pumps to control pressure and vacuum. In some cases, however, infusion from a constant pressure source may be controlled/throttled by a rotary proportional valve, or aspiration could be controlled/throttled by a rotary proportional valve coupled to a constant vacuum source of a fluid reservoir.

Accordingly, in certain aspects, the fluidic pump systems 106, 108 may include a fluidic pump driven by a brushless slotless direct current (BSDC) motor, which may be commutated through digital sine-wave commutation techniques. For instance, the infusion pump system 106 may include an infusion fluidic pump configured, when driven by a first BSDC motor commutated by digital sine-wave commutation techniques, to pump fluid into the surgical handpiece 110, and the aspiration pump system 108 may include an aspiration fluidic pump configured, when driven by a second BSDC motor commutated by digital sine-wave commutation techniques, to pump fluid out of the surgical handpiece 110. In some aspects, the fluidic pump systems 106, 108 may include a constant pressure/vacuum source that is controlled by a rotary proportional valve. The rotary proportional valve may in turn be controlled (e.g., open or closed, as needed) by a BSDC motor coupled to the rotary proportional valve. Although shown as being within the console 102, components of one or both of the fluidic pump systems 106, 108 may be located elsewhere, such as in a separate console or in the surgical handpiece 110. For example, in some implementations, a BSDC motor may drive a fluidic pump in the surgical handpiece 110 to provide aspiration control.

Use of a BSDC motor may reduce the ringing, oscillation, or overshoot caused by traditional stepper motors, and may provide other advantages. In some cases, motor current and torque may be proportional to fluid pressure using such techniques. BSDC motors may be well-suited for driving fluidic pumps in ophthalmic surgical systems versus other choices, such as conventional brushless direct current (BLDC) motors, because of their inherent characteristics. For example, BSDC motors may produce approximately 0.5% torque ripple compared with 40% of conventional BLDC motors. In addition, BSDC motors may be more thermodynamically efficient than conventional BLDC motors because of reduced eddy current losses in the motor circuitry. Further, BSDC motors may be used for zero-velocity, direct drive applications as well as rapid acceleration/high speed applications that may be required for ophthalmic procedures (e.g., phacoemulsification procedures), as they provide low latency following commands (e.g., from a foot pedal connected to the console 102 and operated by a surgeon). In certain embodiments, the infusion pump system 106, the aspiration pump system 108, or both, may be implemented similar to the fluidic pump system 200 of FIG. 2.

Figure 2:
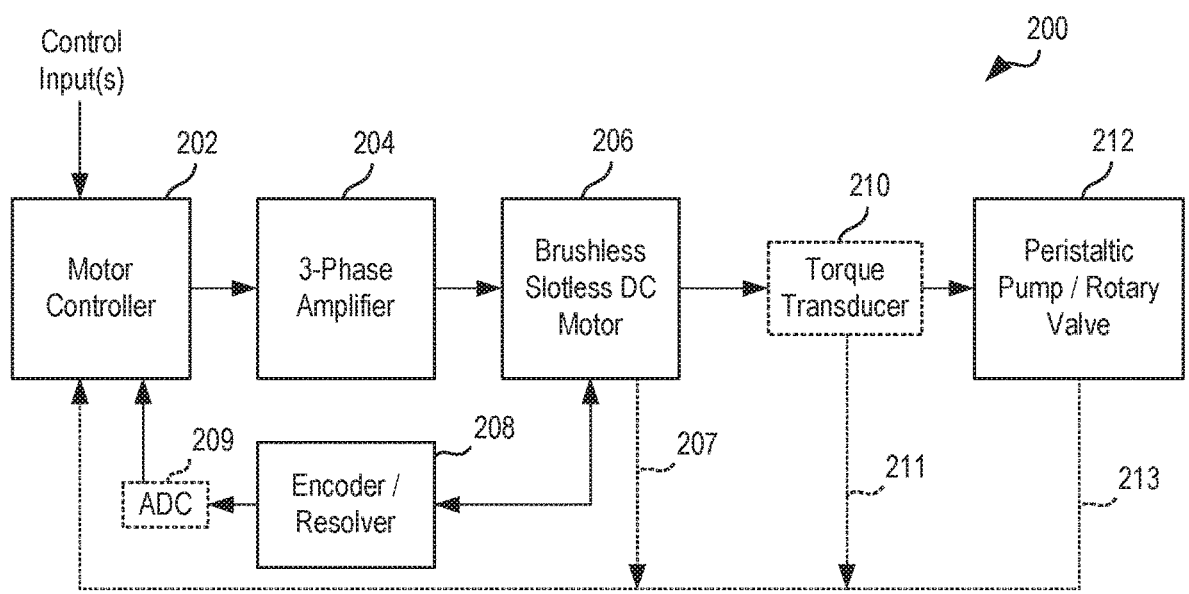
FIG. 2 is a diagram of an example fluidic pump system.

FIG. 2 is a diagram of an example fluidic pump system 200. In some cases, the example fluidic pump system 200 may be incorporated into an ophthalmic surgical system, such as the ophthalmic surgical system 100 of FIG. 1 (e.g., in the infusion pump system 106, the aspiration pump system 108, both, or another fluidic pump system in the ophthalmic surgical system 100), or another type of ophthalmic surgical system. In some cases, one or more components of the fluidic pump system may be located within a surgical handpiece coupled to a console. The fluidic pump system 200 may be used, in some cases, to pump fluid into or out of a surgical handpiece during an ophthalmic procedure. The fluidic pump system 200 may include additional, fewer, or different components than those illustrated in FIG. 2. Further, the components of the fluidic pump system 200 may be arranged in another manner than that shown in FIG. 2.

The example fluidic pump system 200 includes a motor controller 202, a three-phase amplifier 204, a brushless slotless direct current (BSDC) motor 206, commutation circuitry 208, and a fluidic pump 212. In some cases, each of these components is implemented within a contained fluidic pump system of an ophthalmic surgical system (e.g., entirely within the infusion pump system 106 or aspiration pump system 108 of FIG. 1). In other cases, some components (e.g., the motor controller 202, three-phase amplifier 204, or both) may be implemented within a control system of the ophthalmic surgical system (e.g., within the control system 104 of FIG. 1), while the other components (e.g., the BSDC motor 206, commutation circuitry 208, and fluidic pump 212) are implemented within a fluidic pump system of the ophthalmic surgical system (e.g., within the infusion pump system 106, the aspiration pump system 108, or both). The fluidic pump 212 may include a fluidic pump (e.g., a peristaltic pump) that pumps fluid, or a rotary proportional valve that is coupled to a constant pressure/vacuum source and controls the flow generated by the source.

The motor controller 202 includes circuitry for generating command signals for driving the BSDC motor 206. For example, the motor controller 202 may include one or more FPGAs, DSPs, ASICs, SOCs, or other logic circuitry for generating the command signals. In some cases, the motor controller 202 may generate the command signals based on one or more feedback or control signals, such as position information from the encoder, sensed/measured current, torque, or vacuum/pressure signals provided by components of the fluidic pump system 200 (e.g., from the BSDC motor 206, the torque transducer 210, or a pressure sensor (e.g., non-invasive pressure sensor (NIPS)) coupled to the fluidic pump 212, respectively), other feedback signals (e.g., signals provided by the commutation circuitry 208), or control signals (e.g., from a command input, such as a foot pedal/control used by a surgeon to control infusion/aspiration pressures), as shown in FIG. 2. Infusion pump flow rates or infusion pressures may be selected by a surgeon using host processor that communicates with the pump controller controlling the infusion pump. The aspiration rate or vacuum level may be controlled by a surgeon control (e.g., foot pedal or foot switch) connected to the host processor, which is in turn connected to the motor controller driving the aspiration pump.

The command signals may be provided to the three-phase amplifier 204. The three-phase amplifier 204 may generate a three-phase signal based on the command signals provided by the motor controller 202. For example, in some cases, the motor controller 202 may provide two command signals (e.g., two sine waves that are 120 degrees apart), and the three-phase amplifier 204 may generate a third signal (which is the derived third phase necessary to drive a three-phase motor with three current (torque) and voltage (angular velocity) controlled sine waves 120 degrees apart) to output a three-phase signal. The three-phase amplifier 204 may be a pulse width modulation (PWM) three-phase amplifier or a linear three-phase amplifier. In some instances, the three-phase amplifier 204 may be integrated with the motor controller 202. The three-phase signal may then be provided to the BSDC motor 206 to drive the motor and operate the fluidic pump 212 mechanically coupled to the BSDC motor 206. The BSDC motor 206 may be implemented by a magnetic circuit geometry designed to reduce torque ripple, or may be implemented in another manner. As an example, the BSDC motor 206 may include a moving magnet with NdFeB rotors.

The commutation circuitry 208 includes circuitry for commutating the BSDC motor 206 and for closing a position servo loop of the BSDC motor 206 (e.g., to drive the BSDC motor 206 to a desired position). The commutation circuitry may provide digital sine-wave commutation of the BSDC motor 206. The commutation circuitry may also include a position encoder that provides an indication of angular position of the BSDC motor 206 and a velocity of the BSDC motor 206 (since velocity is the first derivative of position) to the motor controller 202. The commutation circuitry 208 may be positioned on or near a shaft of the BSDC motor 206 and may provide information as an input to the motor controller 202. The commutation circuitry 208 may, in some cases, receive input from the encoder that is on a shaft of the BSDC motor 206 (e.g., a shaft opposite the output shaft), which is mechanically coupled to the fluidic pump 212.

In some cases, the commutation circuitry 208 may include an encoder or resolver. For example, in some embodiments, the commutation circuitry 208 may include a sine-cosine encoder (which may be sometimes referred to as holographic encoders). In some cases, the sine-cosine encoder includes incremental encoder functionality, which may enable smooth commutation of the BSDC motor 206. The sine-cosine encoder may also include absolute encoder functionality, or the commutation circuitry 208 may include an absolute encoder in addition to the sine-cosine encoder. Absolute encoder functionality (provided by the sine-cosine encoder or the separate absolute encoder) may eliminate or reduce a need for home and limit switches and may enable a restart at a current position (e.g., if power is interrupted to the system 200) without ambiguity. In embodiments that include a sine-cosine encoder in the commutation circuitry 208, an analog-to-digital converter (ADC) 209 may be coupled to sine-cosine encoder. The ADC may have an output greater than or equal to 16-bits (e.g., 16-bits, 18-bits, or 24-bits). A sine-cosine encoder coupled with an ADC may eliminate the need for Hall-effect encoders, which do not have sufficient counts or resolution to smoothly commutate or control a BSDC motor, such as the BSDC motor 206. In certain embodiments, the commutation circuitry 208 includes a resolver.

In some embodiments, the motor controller 202 implements torque control of the BSDC motor 206 based on one or more of current sensing, torque sensing, and vacuum/pressure sensing techniques. For example, in some implementations, a current sensor coupled to the BSDC motor 206 may provide an indication 207 of a sensed current in the BSDC motor 206 to the motor controller 202 (since current is proportional to torque for BSDC motors). As another example, in some implementations, the fluidic pump system 200 includes a torque transducer 210 coupled to the output shaft of the BSDC motor 206. The torque transducer 210 may detect, measure, or sense an amount of torque output by the BSDC motor 206 and may provide an indication 211 of the detected amount of torque output to the motor controller 202. As another example, a vacuum/pressure sensor coupled to the fluidic pump 212 may provide an indication 213 of a detected vacuum or pressure in the fluidic pump 212 (since torque may be proportional to fluid pressure). The motor controller 202 may utilize one or more of the indications 207, 211, 213 to generate the command signals for driving the BSDC motor 206.

In some embodiments, the fluidic pump system 200 of FIG. 2 may be incorporated into certain teachings of U.S. Pat. No. 9,482,216, entitled "Multiple Segmented Peristaltic Pump and Cassette", which is hereby incorporated by reference. For example, one or more aspects of the fluidic pump system 200 (e.g., the BSDC motor 206 and commutation circuitry 208) may be used to drive a peristaltic pump as described in U.S. Pat. No. 9,482,216.

Figure 3:
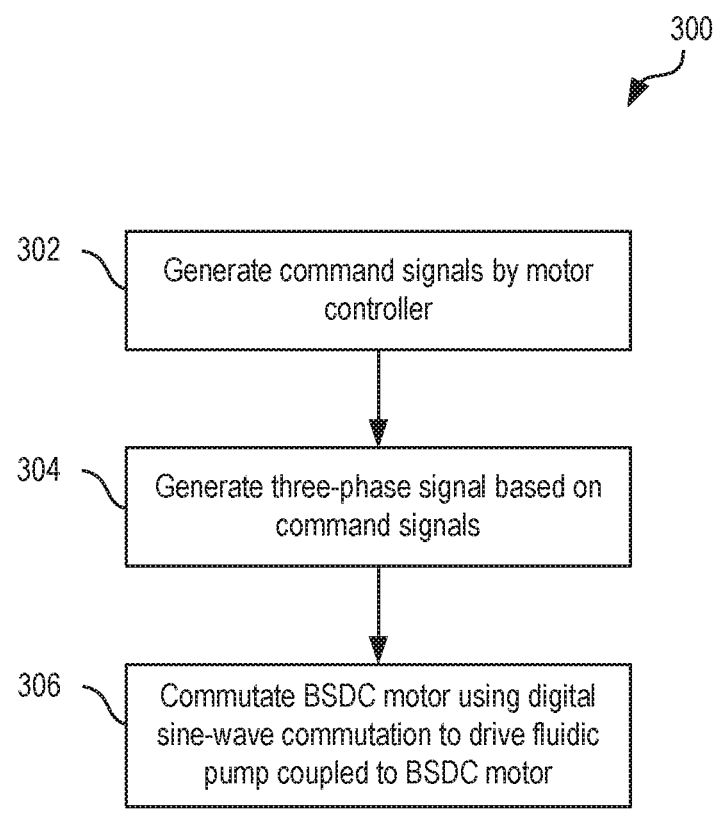
FIG. 3 is a flow diagram of an example process of operating a fluidic pump.

FIG. 3 is a flow diagram of an example process 300 of operating a fluidic pump. Operations in the example process 300 may be performed by components of an ophthalmic surgical system (e.g., components of the infusion pump system 106, the aspiration pump system 108, or both, of FIG. 1, or components of the fluidic pump system 200 of FIG. 2). The example process 300 may include additional or different operations, and the operations may be performed in the order shown or in another order. In some cases, one or more of the operations shown in FIG. 3 are implemented as processes that include multiple operations, sub-processes, or other types of routines. In some cases, operations can be combined, performed in another order, performed in parallel, iterated, or otherwise repeated or performed another manner.

At 302, command signals are generated by a motor controller. For example, referring to FIG. 2, the motor controller 202 may generate command signals. The command signals may be generated based upon one or more inputs to the motor controller, such as information from commutation circuitry, such as an encoder (e.g., a sine-cosine encoder coupled with an ADC) or a resolver, current information for a BSDC motor in the fluidic pump system, torque information from a torque transducer coupled to the output shaft of the BSDC motor, vacuum/pressure information from a fluidic pump of the fluidic pump system, information from a mechanical control for the fluidic pump system (e.g., a control input from a user of the fluidic pump system, such as, for example, a foot control used by an operator of an ophthalmic surgical system), or another type of information. For example, in some cases, a torque transducer coupled to the BSDC motor output shaft may detect an amount of torque being output by the BSDC motor to the fluidic pump, and the detected amount of torque may be indicated to the motor controller, which in turn uses the detected torque information to generate the command signals. Similarly, an amount of current in the BSDC motor or amount of vacuum/pressure in the fluidic pump may be used in the generation of the command signals, since such measures are proportional to the amount of torque being output by the BSDC motor.

At 304, a three-phase signal is generated by the three-phase amplifier based on the command signals generated at 302. For example, referring again to FIG. 2, the three-phase amplifier 204 may generate a three-phase signal based on command signals generated by the motor controller 202. In some instances, the three-phase signal may be generated by deriving a third signal based on two command signals generated by the motor controller. The three-phase signal may be generated in another manner. In some cases, the three-phase amplifier may also amplify the three-phase signal.

At 306, the BSDC motor is commutated based on the three-phase signals generated at 304. The commutation may be performed by certain commutation circuitry, such as a sine-cosine encoder, absolute encoder, an ADC, or a resolver, or a combination thereof, as described above. The commutation circuitry may provide digital sine-wave commutation of the BSDC motor. In some cases, the BSDC motor may be commutated to drive a fluidic pump, such as a peristaltic pump, or may be used to control a valve, such as a rotary proportional valve, coupled to a constant pressure source.

Embodiments of the present disclosure provide systems and methods for controlling or driving fluidic pumps using BSDC motors and associated commutation circuitry. It will be appreciated that above-disclosed and other features and functions, or alternatives thereof, may be desirably combined into many other different systems or applications in accordance with the disclosure. It will also be appreciated that various presently unforeseen or unanticipated alternatives, modifications, variations, or improvements therein may be subsequently made by those skilled in the art which alternatives, variations and improvements are also intended to be encompassed by the following claims.

What is claimed is:

1. A fluidic pump system, comprising:
   a fluidic pump;
   a brushless slotless direct current (BSDC) motor mechanically coupled to the fluidic pump, the BSDC motor configured to drive the fluidic pump;
   a motor controller communicably coupled to the BSDC motor, the motor controller configured to generate command signals for the BSDC motor;
   commutation circuitry coupled to the BSDC motor, the circuitry configured to provide digital sine-wave commutation of the BSDC motor and to provide an indication of movement of the BSDC motor to the motor controller; and
   a three-phase amplifier communicably coupled to the motor controller and the BSDC motor, the three-phase amplifier configured to receive the command signals generated by the motor controller and provide a three-phase signal to the BSDC motor based on the signals generated by the motor controller; wherein the three-phase amplifier is a linear three-phase amplifier.

2. An ophthalmic surgical system, comprising:
   a console configured to couple to a surgical handpiece, the console comprising:
      a fluidic pump system comprising a brushless slotless direct current (BSDC) motor mechanically coupled to a fluidic pump; and circuitry coupled to the fluidic pump system, the circuitry configured to control operation of the BSDC motor using digital sine-wave commutation;

wherein the fluidic pump system is configured to be in fluidic communication with a surgical handpiece when the surgical handpiece is coupled to the console.

3. The ophthalmic surgical system of claim 2, wherein the fluidic pump system includes at least one of:
an infusion pump system comprising:
an infusion fluidic pump configured to pump fluid into the surgical handpiece; and
a first BSDC motor coupled to the infusion fluidic pump and configured to drive the infusion fluidic pump; and
an aspiration pump system comprising:
an aspiration fluidic pump configured to pump fluid out of the surgical handpiece; and
a second BSDC motor coupled to the infusion fluidic pump and configured to drive the infusion fluidic pump.

4. The ophthalmic surgical system of claim 2, wherein the circuitry comprises a motor controller communicably coupled to the BSDC motor, the motor controller configured to generate command signals to drive the BSDC motor.

5. The ophthalmic surgical system of claim 4, wherein the circuitry comprises a three-phase amplifier configured to receive the command signals generated by the motor controller and provide a three-phase signal to the BSDC motor based on the signals generated by the motor controller.

6. The ophthalmic surgical system of claim 5, wherein the three-phase amplifier includes a pulse width modulation (PWM) three-phase amplifier or a linear three-phase amplifier.

7. The ophthalmic surgical system of claim 2, wherein the fluidic pump includes a peristaltic pump or a rotary proportional valve.

8. The ophthalmic surgical system of claim 2, wherein the circuitry includes at least one of a sine-cosine encoder, an absolute encoder, a resolver, and an analog-to-digital converter (ADC).

9. The ophthalmic surgical system of claim 2, wherein the circuitry further comprises a torque transducer coupled to the BSDC motor and the motor controller, the torque transducer configured to detect an amount of torque output by the BSDC motor and provide an indication of the detected amount of torque to the motor controller.

10. A method of operating a fluidic pump, comprising:
generating, by a motor controller, one or more command signals for a brushless slotless direct current (BSDC) motor;
generating, by a three-phase amplifier, a three-phase signal based on the command signal; and
commutating, using digital sine-wave commutation provided by a sine-cosine encoder and an analog-to-digital converter (ADC) coupled to the BSDC motor, the BSDC motor to drive a fluidic pump coupled to the BSDC motor.

11. The method of claim 10, further comprising detecting, by a torque transducer coupled to the BSDC motor, an amount of torque output by the BSDC motor to the fluidic pump, wherein generating the one or more command signals is based on the amount of torque output detected by the torque transducer.

12. A fluidic pump system, comprising:
a fluidic pump;
a brushless slotless direct current (BSDC) motor mechanically coupled to the fluidic pump, the BSDC motor configured to drive the fluidic pump;
a motor controller communicably coupled to the BSDC motor, the motor controller configured to generate command signals for the BSDC motor; and
commutation circuitry coupled to the BSDC motor, the circuitry configured to provide digital sine-wave commutation of the BSDC motor and to provide an indication of movement of the BSDC motor to the motor controller, wherein the commutation circuitry comprises a sine-cosine encoder and an analog-to-digital converter (ADC) coupled to the sine-cosine encoder.

13. The fluidic pump system of claim 12, wherein the commutation circuitry comprises an absolute encoder.

14. The fluidic pump system of claim 12, wherein the sine-cosine encoder includes absolute encoder functionality.

15. A fluidic pump system, comprising:
a fluidic pump;
a brushless slotless direct current (BSDC) motor mechanically coupled to the fluidic pump, the BSDC motor configured to drive the fluidic pump;
a motor controller communicably coupled to the BSDC motor, the motor controller configured to generate command signals for the BSDC motor;
commutation circuitry coupled to the BSDC motor, the circuitry configured to provide digital sine-wave commutation of the BSDC motor and to provide an indication of movement of the BSDC motor to the motor controller; and
torque sensing circuitry, the torque sensing circuitry configured to detect a torque output by the BSDC motor and to provide an indication of the detected torque output to the motor controller.

* * * * *